United States Patent
Nakamura et al.

(10) Patent No.: US 11,859,088 B2
(45) Date of Patent: Jan. 2, 2024

(54) AQUEOUS COLORANT MATERIAL SOLUTION, PRODUCTION METHOD FOR AQUEOUS COLORANT MATERIAL, AND BLUE-COLORED BEVERAGE

(71) Applicant: DIC Corporation, Tokyo (JP)

(72) Inventors: Hiromasa Nakamura, Sakura (JP); Hisayoshi Arai, Sakura (JP)

(73) Assignee: DIC Corporation, Tokyo (JP)

( * ) Notice: Subject to any disclaimer, the term of this patent is extended or adjusted under 35 U.S.C. 154(b) by 659 days.

(21) Appl. No.: 17/052,345

(22) PCT Filed: Dec. 10, 2019

(86) PCT No.: PCT/JP2019/048230
§ 371 (c)(1),
(2) Date: Nov. 2, 2020

(87) PCT Pub. No.: WO2020/129745
PCT Pub. Date: Jun. 25, 2020

(65) Prior Publication Data
US 2021/0087402 A1    Mar. 25, 2021

(30) Foreign Application Priority Data
Dec. 17, 2018 (JP) .................. 2018-235420

(51) Int. Cl.
A23L 2/58 (2006.01)
A23L 5/41 (2016.01)
C09B 61/00 (2006.01)

(52) U.S. Cl.
CPC ............... *C09B 61/00* (2013.01); *A23L 2/58* (2013.01); *A23L 5/41* (2016.08)

(58) Field of Classification Search
CPC ............. A23L 2/58; A23L 5/41; C09B 61/00
See application file for complete search history.

(56) References Cited

U.S. PATENT DOCUMENTS

| | | | | |
|---|---|---|---|---|
| 2005/0267067 A1* | 12/2005 | Oku | ............ | A61K 8/60 514/19.3 |
| 2013/0216665 A1* | 8/2013 | Mason | ............ | A23L 5/44 426/519 |
| 2019/0350234 A1 | 11/2019 | Mizushima et al. | | |
| 2020/0277500 A1 | 9/2020 | Yokota et al. | | |

FOREIGN PATENT DOCUMENTS

| | | | |
|---|---|---|---|
| EP | 3 375 298 A1 | 9/2018 | |
| JP | S52-134058 A | 11/1977 | |
| JP | H11-299450 A | 11/1999 | |
| JP | 2018-050542 A | 4/2018 | |
| WO | 2015/152199 A1 | 10/2015 | |
| WO | 2018/003599 A1 | 1/2018 | |
| WO | 2019/054472 A1 | 3/2019 | |
| WO | 2019/111615 A1 | 6/2019 | |

OTHER PUBLICATIONS

Yoshikawa, N. and Belay, A. "Single-laboratory validation of a method for the determination of c-phycocyanin and allophycocyanin in Spirulina (Arthrospira) supplements and raw materials by spectrophotometry" Journal of AOAC International vol. 91, No. 3, 524-529 (2008). (discussed in the spec).
International Search Report dated Mar. 3, 2020, issued for PCT/JP2019/048230.
S. K. Mishra et al., "Effect of preservatives for food grade C-PC from Spirulina platensis", Process Biochemistry, Elsevier Ltd, GB, vol. 43, No. 4, Dec. 31, 2007, pp. 339-345. (cited in the Jul. 5, 2021 Search Report issued for EP19900712.1).
Supplementary European Search Report dated Jul. 5, 2021, issued for European Patent Application No. 19900712.1.

* cited by examiner

*Primary Examiner* — Anthony J Weier
(74) *Attorney, Agent, or Firm* — Locke Lord LLP

(57) ABSTRACT

A color material aqueous solution having excellent thermal stability under acidic conditions, a method for manufacturing such a color material aqueous solution, and a blue-colored beverage are provided. Provided are: an acidic color material aqueous solution containing phycocyanin (A), a polyvalent carboxylic acid (B) containing one or more hydroxy groups, and at least one kind of nonionic emulsifier (C) selected from the group consisting of sucrose esters and polyglycerol esters, the at least one kind of nonionic emulsifier (C) having an HLB of 15 or more; a method for manufacturing an acidic color material aqueous solution including a step of dissolution in water (D); a method for manufacturing a color material aqueous solution in which the raw materials are dissolved in water; and a blue-colored beverage.

8 Claims, No Drawings

AQUEOUS COLORANT MATERIAL SOLUTION, PRODUCTION METHOD FOR AQUEOUS COLORANT MATERIAL, AND BLUE-COLORED BEVERAGE

TECHNICAL FIELD

The present invention relates to a color material aqueous solution suited for coloring, for example, foods, beverages, medicines, and cosmetics, a method for manufacturing such a color material aqueous solution, and a blue-colored beverage.

BACKGROUND ART

As pigments for foods, a wide variety of red pigments, yellow pigments, and blue pigments exist, but in recent years, synthetic colorants have been questioned due to problems such as carcinogenicity, and a larger expectation has been placed on natural pigments considered to have higher safety. However, natural pigments have advantages and disadvantages in physical properties, and among such pigments red pigments and blue pigments that exhibit a vivid color tone in particular are currently few.

Among algal pigments, phycocyanin is a vivid blue pigment and phycoerythrin is a vivid red pigment. Because of being protein-binding pigments, these algal pigments have poor thermal stability particularly in a solution, and their scope of usability has been narrow. Furthermore, in a step of manufacturing a beverage containing a color material, problems such as fading and precipitation during a heat sterilization step have existed.

CITATION LIST

Patent Literature

PTL 1: Japanese Unexamined Patent Application Publication No. 11-299450

SUMMARY OF INVENTION

Technical Problem

Pigments need to have high thermal resistance in any of acidic, neutral, and basic (alkaline) liquids to be able to be used for any of various applications. Phycocyanin in particular has a defect in which, for example, a valuable vivid color fades when subjected to a thermal history such as heat sterilization performed.

The present invention has been made in light of the above-described situation and has an object to provide a color material aqueous solution having excellent thermal stability under acidic conditions, a method for manufacturing such a color material aqueous solution, and a blue-colored beverage.

Solution to Problem

As a result of repeated intensive studies to achieve the above-described object, the present inventors have found that the object can be achieved with an acidic color material aqueous solution containing phycocyanin (A), a polyvalent carboxylic acid (B) containing one or more hydroxy groups, and at least one kind of nonionic emulsifier (C) selected from the group consisting of sucrose esters and polyglycerol esters, the at least one kind of nonionic emulsifier (C) having an HLB of 15 or more, thus completing the present invention.

Thus, a color material aqueous solution, a method for manufacturing such a color material aqueous solution, and a blue-colored beverage according to the present invention are characterized by the following.

1. An acidic color material aqueous solution containing phycocyanin (A), a polyvalent carboxylic acid (B) containing one or more hydroxy groups, and at least one kind of nonionic emulsifier (C) selected from the group consisting of sucrose esters and polyglycerol esters, the at least one kind of nonionic emulsifier (C) having an HLB of 15 or more.
2. The color material aqueous solution according to 1 above, where the acidity of the color material aqueous solution is a hydrogen ion concentration index (pH) of 3 or less.
3. A method for manufacturing an acidic color material aqueous solution including a step of dissolving phycocyanin (A), a polyvalent carboxylic acid (B) containing one or more hydroxy groups, and at least one kind of nonionic emulsifier (C) selected from the group consisting of sucrose esters and polyglycerol esters, the at least one kind of nonionic emulsifier (C) having an HLB of 15 or more, in water (D).
4. The method for manufacturing a color material aqueous solution according to 3 above, where a hydrogen ion concentration index (pH) of 3 or less is achieved.
5. The method for manufacturing a color material aqueous solution according to 3 or 4 above further including a step of removing phycocyanin aggregates.
6. A blue-colored beverage containing the color material aqueous solution according to 1 above.
7. A blue-colored beverage containing the color material aqueous solution according to 2 above.

Advantageous Effects of Invention

According to the present invention, a distinctly remarkable technical effect of being able to provide a color material aqueous solution having excellent thermal stability under acidic conditions, a method for manufacturing such a color material aqueous solution, and a blue-colored beverage is achieved.

DESCRIPTION OF EMBODIMENTS

<Color Material>

Hereafter, the present invention will be described on the basis of a suitable embodiment.

A color material aqueous solution according to the present invention contains phycocyanin (A), a polyvalent carboxylic acid (B) containing one or more hydroxy groups, and at least one kind of nonionic emulsifier (C) selected from the group consisting of sucrose esters and polyglycerol esters, the at least one kind of nonionic emulsifier (C) having an HLB of 15 or more.

(Phycocyanin)

Phycocyanin (A) is one kind of phycobiliprotein and is a blue pigment containing phycocyanobilin and protein and being a solid at a normal temperature. The phycocyanin (A) may be C-phycocyanin, allophycocyanin, or R-phycocyanin. The phycocyanin (A) can be obtained, for example, through extraction thereof from algae using a freely selected technique.

As the phycocyanin (A), any of publicly known and commonly used phycocyanin (A) can be used, and examples thereof include algal pigments derived from various algae such as blue-green algae and red algae. The phycocyanin (A) may be a natural product. However, the phycocyanin (A) is preferably a Spirulina pigment containing, as a main component, phycobiliprotein of blue-green algae belonging to the genus Arthrospira or the genus Spirulina (which hereafter may be referred to as "Spirulina") due to its capability of being artificially cultivated through various culture methods and its ease of availability. The phycocyanin (A) per se mainly exhibits a blue color and thus is used as a blue color material.

The method for obtaining phycocyanin from "Spirulina" is not particularly limited. However, phycocyanin can be extracted, for example, through a method of extraction thereof from Spirulina and into a buffer liquid. For example, phycocyanin can be obtained through a method disclosed in the literature (Japanese Unexamined Patent Application Publication No. 52-134058).

(Polyvalent Carboxylic Acid Containing One or More Hydroxy Groups)

The polyvalent carboxylic acid (B) containing one or more hydroxy groups is a carboxylic acid containing one or more hydroxy groups and two or more carboxy groups [and is hereafter abbreviated as "carboxylic acid (B)"]. In the present invention, the definition of the carboxylic acid (B) does not include a salt of the carboxylic acid. The carboxylic acid (B) is a compound containing free carboxyl groups not converted to salts.

The carboxylic acid (B) may be a solid or a liquid at a normal temperature. Because of being used in combination with the phycocyanin (A), the carboxylic acid (B) per se preferably has the same color, taste, and smell as the phycocyanin (A) or is preferably colorless, tasteless, and odorless. When the (A) and (B) according to the present invention are used under acidic conditions, the carboxylic acid (B) may have a sour taste.

Examples of the carboxylic acid (B) include citric acid, malic acid, and tartaric acid. Citric acid is particularly preferably used as the carboxylic acid (B) because the structural stability of the phycocyanin (A) under acidic conditions is increased when the phycocyanin (A) and the polyvalent carboxylic acid (B) containing one or more hydroxy groups are combined.

The inventors have found that the emulsifier (C) has an effect of enhancing the thermal stability of the phycocyanin (A), particularly under acidic conditions, as illustrated in Examples described later. The effect is inherent to the emulsifier (C).

In the present invention, the dispersion stability of the phycocyanin (A) in an aqueous solution can be enhanced when at least one kind of nonionic emulsifier (C) selected from the group consisting of sucrose esters and polyglycerol esters, the at least one kind of nonionic emulsifier (C) having an HLB of 15 or more [and hereafter being abbreviated as "emulsifier (C)"], is further contained. The term "HLB" is an acronym for "Hydrophilic-Lipophilic Balance" and is an indicator indicating the balance between the hydrophobicity and hydrophilicity of an emulsifier. The HLB value can be a value of 0 to 20, and a larger HLB value denotes higher hydrophilicity.

It is important that this emulsifier (C) is neither an anionic emulsifier nor a cationic emulsifier but a nonionic emulsifier with which an object to be emulsified undergoes less changes in emulsion stability with respect to pH changes and that this emulsifier (C) is highly hydrophilic.

Examples of the emulsifier (C) include sucrose esters and polyglycerol esters, and at least one kind selected from the group consisting of the foregoing can be used. A sucrose ester is an ester of sucrose and a fatty acid derived from vegetable oil, existing in various HLBs depending on the fatty acid composition. A polyglycerol ester is an ester of polyglycerol obtained by dehydration-condensing glycerol derived from vegetable oil and a fatty acid derived from vegetable oil, existing in various HLBs depending on the degree of polymerization of the polyglycerol and the kind and degree of esterification of the fatty acid.

Examples of the sucrose ester include RYOTO (registered trade mark) Sugar Ester (Mitsubishi-Chemical Foods Corporation) and DK ESTER (registered trade mark) (Dai-ichi Kogyo Seiyaku Co., Ltd.) with various corresponding stock numbers. Examples of the polyglycerol ester include RYOTO (registered trade mark) Polyglyester and SY-Glyster (Sakamoto Yakuhin Kogyo, Co., Ltd.) with various corresponding stock numbers.

Compared with emulsifiers having a different chemical structure, these have an excellent affinity with the phycocyanin (A), an excellent affinity with water (D), and excellent emulsifying properties regardless of fluctuations in pH, thereby contributing to a more excellent stabilizing effect with a smaller amount used.

In the present invention, the amount of the emulsifier (C) used is not particularly limited. However, when the emulsifier (C) is contained as a non-volatile component in an amount of, for example, 1 g to 30 g, particularly 4 g to 14 g, and most preferably 4 g to 8 g with respect to 1 g of the phycocyanin (A), the dispersion stability of the phycocyanin (A) in an aqueous solution can be enhanced, and changes in the color value per se (color value retention rate) and changes in the color tone (color difference) before and after being subjected to a thermal history can be kept small. Thus, such an amount is preferable. With what is not the emulsifier (C), the above-described superiority when the emulsifier (C) as used in the present invention is selected for use is less likely to be obtained. For example, an anionic surfactant such as sodium dodecyl sulfate, when assumed to be used for food purposes, is largely restricted in the amount used due to various regulations of each country, and an anionic surfactant such as oleic acid is likely to be subjected to changes in stability depending on the pH when used.

In preparation of the color material aqueous solution according to the present invention, the above-described emulsifier (C) may be used alone, but as needed, the emulsifier (C) may be used in combination with other emulsifiers. Examples of such emulsifiers that can be used in combination include sorbitan fatty acid esters, propylene glycol fatty acid esters, lecithins, lysolecithins, citric acid monoglyceride, saponins, and casein sodium. Examples other than the foregoing and limited in use include oxyethylene fatty acid alcohol, sodium oleate, morpholine fatty acid salts, polyoxyethylene higher fatty acid alcohol, calcium stearoyl lactylate, and monoglyceride ammonium phosphate.

As the water (D), any of publicly known and commonly used water can be used, and, for example, distilled water, ion-exchanged water, or purified water can be used. In the present invention, because the above-described carboxylic acid (B) is used, it is preferable to use water having a pH of 7, the water containing no ionic component or containing an ionic component as little as possible.

(Regarding Component Proportion)

The color material aqueous solution according to the present invention contains, as essential components, the phycocyanin (A), the polyvalent carboxylic acid (B) containing one or more hydroxy groups, the emulsifier (C), and the water (D) and is prepared such that, with respect to 1 g of the phycocyanin (A), the polyvalent carboxylic acid (B) containing one or more hydroxy groups is contained in an amount of 200 mmol to 400 mmol in terms of carboxylic acid equivalent and the emulsifier (C) is contained in an amount of 1 g to 30 g. The content of the water (D) in the color material aqueous solution is not particularly limited, but the water (D) can be used such that, by mass, with respect to a total of 100 parts of the phycocyanin (A) and the polyvalent carboxylic acid (B) containing one or more hydroxy groups, 4000 parts to 25000 parts of the water (D) is contained. When the phycocyanin (A), the polyvalent carboxylic acid (B) containing one or more hydroxy groups and the emulsifier (C) are dissolved in water (D) to achieve the above-described component proportion, the pH of the resulting aqueous solution is 3 or less.

Although depending on the combination proportion of the carboxylic acid (B) and the emulsifier (C) dissolved in the water (D), as the total amount of the phycocyanin (A), the carboxylic acid (B), and the emulsifier (C) is increased, a more concentrated color material aqueous solution having a darker blue color is obtained, in which case, for example, dilution is performed as needed. This is preferable because when coloring with the same color value is performed, such coloring can be performed on a larger quantity of objects to be colored. Reasonably, instead of once preparing a concentrated color material aqueous solution and thereafter diluting the color material aqueous solution, a dilute color material aqueous solution may be immediately obtained to achieve a concentration that matches the use and purpose without once preparing a concentrated color material aqueous solution.

(Absorbance)

Furthermore, the color material aqueous solution according to the present invention has an optical density of 0.05 or less with respect to 1 cm of optical path length at 800 nm at a hydrogen ion concentration index (pH) of 3 or less when all the (A), (B), and (C) are added such that the color value expressed as the absorbance at 620 nm is 0.4 to 1.0.

Here, the expression "all the (A), (B), and (C) are added such that the color value expressed as the absorbance at 620 nm is 0.4 to 1.0" refers to a status in which all the (A), (B), and (C) are added such that the color value is a color value at any one point selected in the range of 0.4 to 1.0. Likewise, the expression "an optical density at a hydrogen ion concentration index (pH) of 3 or less" refers to an optical density at any one point selected in the range of a hydrogen ion concentration index (pH) of 3 or less. The excellent thermal stability of coloring with the color material aqueous solution according to the present invention under acidic conditions can be confirmed by performing a comparison of optical density between an existing publicly known color material aqueous solution and the color material aqueous solution according to the present invention under the conditions in which the color value and the pH are fixed in the above-described range.

In the present invention, it is defined as "all the (A), (B), and (C) are added such that the color value expressed as the absorbance at 620 nm is 0.4 to 1.0", but the color value of 0.4 to 1.0 is merely a measurement condition for determining the optical density with respect to 1 cm of optical path length at 800 nm using a color material aqueous solution having a hydrogen ion concentration index (pH) of 3 or less. As described above, not only a concentrated color material aqueous solution but also a dilute color material aqueous solution is acceptable, and a color material aqueous solution whose color value deviates from the range of 0.4 to 1.0 does not indicate the uniform exclusion thereof from the technical scope of the present invention. That is, in the present invention, it is assumed that the optical density is measured in the color value range of 0.4 to 1.0, and in the case of a color material aqueous solution having a color value of less than 0.4, for example, concentration is performed to measure the optical density at any point in the color value range of 0.4 to 1.0. On the other hand, in the case of a color material aqueous solution having a color value of more than 1.0, for example, dilution is performed to measure the optical density at any point in the color value range of 0.4 to 1.0. When the results are 0.05 or less, the color material aqueous solution can be determined as belonging to the technical scope of the present invention.

When coloring is performed on an object to be colored using a color material aqueous solution, in the case where the color material aqueous solution contains a certain component that is insoluble, the color material aqueous solution per se looks turbid, providing a negative sensory impression. Even if coloring per se can be performed on an object to be colored to some extent, partial coloring unevenness may result. In the case where the object to be colored is, for example, a beverage, substantial inconvenience, such as poor texture when ingested, may result. The degree of presence of water insolubles represented by phycocyanin aggregates can be evaluated by measuring the optical density at an incident light wavelength of 800 nm. As the optical density measurement value (OD) is smaller, the content of water insolubles is smaller, and a color material aqueous solution having smaller or no defects such as those described above is obtained.

(Method for Manufacturing Color Material Aqueous Solution)

The color material aqueous solution according to the present invention can be prepared by mixing the phycocyanin (A), the polyvalent carboxylic acid (B) containing one or more hydroxy groups, the emulsifier (C), and the water (D) in a predetermined component proportion as described above by mass and by dissolving the phycocyanin (A), the carboxylic acid (B), and the emulsifier (C) in the water (D).

In a method for manufacturing a color material aqueous solution according to the present invention, the phycocyanin (A) per se may be used as the raw material, but as needed, the phycocyanin (A) may be replaced with publicly known and commonly used phycobiliprotein containing the phycocyanin (A).

When the phycocyanin (A), the carboxylic acid (B), and the emulsifier (C) are dissolved in the water (D), examples of the method include a method in which a solution of the phycocyanin (A) in the water (D) is prepared and thereafter the carboxylic acid (B) and the emulsifier (C) are further dissolved in the solution, a method in which a solution of the carboxylic acid (B) in the water (D) is prepared and thereafter the phycocyanin (A) and the emulsifier (C) are further dissolved in the solution, and a method in which the phycocyanin (A), the carboxylic acid (B), and the emulsifier (C) are dissolved in the water (D) at the same time in parallel.

As the method of making the phycocyanin (A), the carboxylic acid (B), and the emulsifier (C) in contact with one another in the water (D), a publicly known mixing method can be employed. For example, various dynamic and static mixing methods using a juicer, a mixer, a mill, a micromixer, or the like in which stirring with stirring blades, collision of liquids with one another, and repeated liquid coalescence and separation, and the like are performed can be operated in a freely selected manner.

The phycocyanin (A), the carboxylic acid (B), and the emulsifier (C) may be mixed at one time or in portions or an aqueous solution of each of the foregoing may be prepared and thereafter mixed with the water (D).

In preparation of an aqueous solution, the temperatures of the phycocyanin (A), the carboxylic acid (B), the emulsifier (C), and the water (D) are not particularly limited, and may be appropriately set according to the kinds of the phycocyanin (A), the carboxylic acid (B), and the emulsifier (C) used. However, for example, any of these temperatures is 0° C. or more and 50° C. or less. The difference in temperature between the foregoing four is preferably as small as possible, because in this case flaws such as aggregation are less likely to occur during mixing.

In the method for manufacturing a color material aqueous solution according to the present invention, for example, a step of dissolving phycocyanin (A) the polyvalent carboxylic acid (B) containing one or more hydroxy groups and emulsifiers (C) in water (D) is performed as an essential step to thereby manufacture a color material aqueous solution having a hydrogen ion concentration index (pH) of 3 or less. Color material aqueous solutions having various concentrations obtained through this step of dissolution in water can be immediately used for coloring performed on an object to be colored, but an aging step, for example, aging for 5 to 48 hours and at a temperature of 15° C. to 30° C., may be included.

In the method for manufacturing a color material aqueous solution, in the step of dissolving the phycocyanin (A), the carboxylic acid (B), and the emulsifier (C) in the water (D), when a tiny amount of water insolubles including phycocyanin aggregates is produced, it is more preferable to perform a step of removing such water insolubles following the step of dissolution. It is acceptable to once prepare a concentrated color material aqueous solution and thereafter dilute the color material aqueous solution to thereby prepare a dilute color material aqueous solution having a desired concentration. However, preparing a dilute color material aqueous solution having a desired concentration without passing through a step of preparing a concentrated color material aqueous solution is preferable. This is because this approach makes flaws such as aggregation as described above less likely to occur, makes the degree of aggregation minor if any aggregation occurs, and enables the step of removing water insolubles to be skipped or enables increased ease and increased reduction in the load involved in the removal step, thereby contributing to the enhancement of productivity.

In the step of removing water insolubles, for example, techniques such as decantation, filtration, or centrifugation can be employed. In the method for manufacturing a color material aqueous solution according to the present invention, as needed, under conditions in which water insolubles such as those mentioned above are less likely to be produced, a concentration step may be further included as an essential step to concentrate a color material aqueous solution.

In the present invention, when the carboxylic acid (B) and the emulsifier (C) are dissolved in the water (D) together with the phycocyanin (A), the solubility of the phycocyanin (A) in the resulting aqueous solution is enhanced by a certain interaction. The details are unknown, but conceivably, the carboxyl groups of the carboxylic acid (B) and the hydrophobic portions of the emulsifier (C) are selectively oriented toward the surface side of the phycocyanin (A), and the hydroxy groups (hydroxyl groups) are selectively oriented toward the water (D) side, thereby further enhancing the solubility of the phycocyanin (A) in the water (D) on the basis of the hydroxy groups. On the other hand, very surprisingly, the present inventors have found that even a color material aqueous solution from which water insolubles such as those mentioned above have been removed per se has excellent thermal stability. Furthermore, an aqueous solution thus obtained is, because of comprising the emulsifier (C), can be suitably used for food purposes.

In the color material aqueous solution according to the present invention, due to the effect of the carboxylic acid (B) and the emulsifier (C), the production of water insolubles is effectively prevented or reduced, and, even after being subjected to a thermal history, a status in which the phycocyanin (A) is stably and uniformly dissolved in the liquid can be retained.

In the method for manufacturing a color material aqueous solution according to the present invention, the phycocyanin (A), the carboxylic acid (B), and the emulsifier (C) are contained in the water (D), and, as needed, water insolubles, such as those mentioned above, that can be produced at an initial stage of mixing the foregoing are removed to thereby be able to easily obtain a color material aqueous solution having excellent thermal stability, the color material aqueous solution undergoing less fading under acidic conditions.

(Other Components)

In the color material aqueous solution, in addition to the phycocyanin (A), the carboxylic acid (B), and the emulsifier (C), other components not corresponding to the foregoing may be contained as non-volatile components. Examples of such other components which are non-volatile components include salts of polyvalent carboxylic acids containing one or more hydroxy groups, excipients, preservatives, various vitamins, various minerals, various saccharides, substances derived from the above-described algae other than protein pigments, and substances derived from culture medium components of the above-described algae.

Other than non-volatile components, the color material aqueous solution according to the present invention may further contain an organic solvent having a miscibility with water. As the organic solvent, for example, ethanol or isopropanol can be used.

Examples of a salt (E) of a polyvalent carboxylic acid containing one or more hydroxy groups include metal salts and amine salts (hereafter referred to as conjugate bases) of the carboxylic acid (B) exemplified above. Examples of the metal salts include sodium salts, potassium salts, calcium salts, and aluminum salts. A polyvalent carboxylic acid containing one or more hydroxy groups, with at least some of the carboxyl groups contained therein having the above-described salt structure, corresponds to the above-mentioned salt, but one in which all the carboxyl groups have the above-described salt structure is preferably used in view of the ease of handling and raw material procurement.

The technical effect of the present invention is on the basis of a function inherent and unique to the carboxylic acid (B), but a salt (E) of the carboxylic acid equivalent to the conjugate base of the carboxylic acid (B) may be further contained in a small amount within the scope that does not impair the technical effect. The number of moles used of the salt (E) of the carboxylic acid is in a range smaller than that of the carboxylic acid (B), and specifically, it is preferable that a salt (E) of the carboxylic acid/the carboxylic acid (B)=1/99 to 20/80 by number of moles is satisfied because the thermal stability under acidic conditions is excellent. When citric acid is used as the carboxylic acid (B) and a salt (E) thereof is used, specifically, it is preferable that a salt (e) of citric acid/citric acid (b)=10/90 to 20/80 by number of moles is satisfied because the thermal stability under acidic conditions is excellent.

For example, color materials containing at least one kind of compound selected from the group consisting of saccharides, sugar alcohols, and polyvalent alcohols have been known. Existing color materials may have contained these compounds in a large amount. On the other hand, the color material according to one embodiment of the present invention can improve the thermal stability of the phycocyanin (A) only with the carboxylic acid (B) and the emulsifier (C) and without containing these compounds. Saccharides such as trehalose may be contained in the color material aqueous solution according to the present invention, but their contribution to the enhancement of thermal stability under acidic conditions cannot be expected.

The proportion (% by mass) of the phycocyanin (A) in 100% by mass of non-volatile components of the color material can be obtained through a publicly known analysis method/measurement method. The proportion (% by mass) of the carboxylic acid (B) in 100% by mass of a solid content of the color material is obtained through a publicly known analysis method/measurement method. For example, the mass of the phycocyanin (A) can be measured on the basis of the absorbance of a color material aqueous solution in which the phycocyanin (A) is dissolved in a solvent such as water.

In generally known phycocyanin (A), the relationship between the maximum absorption wavelength of phycocyanin (A) in a solution and the concentration % (w/v) of phycocyanin (A) is known, and the proportion (% by mass) of phycocyanin (A) can be calculated on the basis of the absorbance at the maximum absorption wavelength of the color material solution. For example, in accordance with a method described in the literature (Yoshikawa, N. and Belay, A. (2008) "Single-laboratory validation of a method for the determination of c-phycocyanin and allophycocyanin in Spirulina (Arthrospira) supplements and raw materials by spectrophotometry" Journal of AOAC International VOL. 91, 524-529), the concentration of C-phycocyanin (cPC) in a sample (g/L) and the concentration of allophycocyanin (aPC) in a sample (g/L) can be calculated from the value of the absorbance at the maximum absorption wavelength. Here, the maximum absorption wavelength of cPC in the color material solution is 620 nm and the maximum absorption wavelength of aPC in the color material solution is 650 nm. Phycocyanin in Spirulina can be determined as a sum of cPC and aPC.

For example, the concentration of cPC in a sample can be calculated using the formula below.

$$cPC\ (mg/mL) = 0.162 \times Abs_{620} - 0.098 \times Abs_{650}$$

For example, the concentration of aPC in a sample can be calculated using the formula below.

$$aPC\ (mg/mL) = 0.180 \times Abs_{650} - 0.042 \times Abs_{620}$$

The measurement wavelength is appropriately determined according to the maximum absorption wavelength of a sample solution. For example, when the following phycocyanin (A) is contained as a main component among the pigments contained in the sample solution, the measurement wavelength is 610 nm to 630 nm. An optimal point is determined in this range to perform measurement.

<Use>

The color materials according to the embodiment is suitable to be added to: confections and breads such as ice cream, soft cream, cakes, Bavarian cream, yokan, jelly, gum, gummies, and chocolate; noodles such as soba noodles, udon noodles, and somen noodles; various foods such as tofu, fish cakes, and boiled flat fish cakes; beverages such as matcha green tea beverages, green tea beverages, milk beverages, soy milk beverages, vegetable beverages, fruit beverages, and soft beverages; and medicines, such as tablets, and cosmetics.

With the color material aqueous solution according to the present invention, a beverage colored in blue (blue-colored beverage) having an intended color value can be easily prepared, for example, by diluting a concentrated color material aqueous solution with a solvent as needed to achieve a targeted and desired color value or by concentrating a dilute color material aqueous solution as needed to achieve a targeted and desired color value and thereafter further mixing the resulting color material aqueous solution with a beverage. Particularly in a soft beverage or a fruit beverage (juice) exhibiting its own acidity as a beverage, the color material aqueous solution according to the present invention has a remarkable effect in which excellent thermal resistance is exhibited and even after being subjected to a thermal history such as heat sterilization, no or less fading occurs. Because a soft beverage or a fruit beverage often serves as an acidic buffer solution, for the sake of convenience, such an acidic buffer solution is regarded as a simulated beverage which is an object to be colored. Thus, by diluting the color material aqueous solution according to the present invention and observing a change in the color value before and after heating, the degree of fading under acidic conditions can be confirmed.

The color material aqueous solution according to the present invention alone is suitable for coloring, but the color material aqueous solution may be provided in the form of a composite with other color materials. Examples of such other color materials include not only safflower yellow, gardenia yellow, matcha green tea, and green tea, but also green-colored powders of, for example, young barley leaves, kale, mulberry, bamboo grass, Molokhia, chlorella, green shiso, broccoli, spinach, bell pepper, and ashitaba.

EXAMPLES

Hereafter, the present invention will be described on the basis of Examples.

<Measurement of Absorbance of Solution>

The absorbance of a solution was measured with a UV/Vis spectrophotometer (U-3900H, manufactured by Hitachi High-Tech Science Corporation) using a quartz cell having an optical path length of 1 cm. The number following the display of "Abs" referring to an absorbance denotes a measurement wavelength (nm).

<Thermal Resistance and Acid Resistance Evaluation of Phycocyanin-Containing Blue Color Material Aqueous Solution>

The color value retention rate Abs % before and after heating at $Abs_{620}$ is calculated using the formula below. The thermal resistance and acid resistance can be evaluated according to the value of this Abs %.

$$Abs\ \% = (Abs_{620}\ after)/(Abs_{620}\ before) \times 100$$

Here, the absorbances before and after heating are expressed as "Abs before" and "Abs after", respectively.

Example 1

A total of 0.12% by mass of LINA BLUE G1 (a vegetable blue pigment manufactured by DIC LIFETECH Corporation containing 30% by mass of phycocyanin equivalent, 5% by mass of trisodium citrate, 55% by mass of trehalose, and 10% by mass of other components), 0.125% by mass of RYOTO (registered trade mark) Polyglyester L-7D (HLB=17) (a mass ratio of phycocyanin/emulsifier=0.288), and citric acid and trisodium citrate were dispersed in pure water to achieve a final citric acid concentration of 50 mM and a pH of 2.5. The resulting mixture was centrifuged under conditions of 25° C.×9300 G×5 minutes to thereby remove a precipitate formed of water insolubles including phycocyan aggregates, and the resulting supernatant was collected to obtain a simulated blue-colored beverage.

Next, 1 ml of the simulated blue-colored beverage was dispensed into a 1.5 ml-plastic tube to obtain a simulated blue-colored beverage before heating serving as a sample. The sample was heat treated under conditions of 70° C.×30 minutes in a tabletop incubator (WSL-2610, manufactured by ATTO Corporation), iced for 5 minutes, and thereafter centrifuged under conditions of 25° C.×9300 G×5 minutes to obtain a simulated blue-colored beverage after heating.

The absorbance of the simulated blue-colored beverage before and after heating was measured under the following conditions, and thereafter the color value retention rate was calculated, the color value retention rate serving as an indicator of the thermal stability of pigments under acidic conditions.

The color value retention rate calculated in accordance with the above was 85.5%.

Example 2

The same procedure was performed as in Example 1 to obtain a simulated blue-colored beverage (a mass ratio of phycocyanin/emulsifier=0.036) except that the content of RYOTO (registered trade mark) Polyglyester L-7D was changed from 0.125% by mass to 1.00% by mass.

The same procedure was performed as in Example 1 to heat treat the simulated blue-colored beverage, and the color value retention rate before and after heating was measured. The results indicated that the color value retention rate was 91.7%.

Example 3

The same procedure was performed as in Example 1 to obtain a simulated blue-colored beverage (a mass ratio of phycocyanin/emulsifier=0.576) except that 0.125% by mass of RYOTO (registered trade mark) Polyglyester L-7D was replaced with 0.0625% by mass of RYOTO (registered trade mark) Sugar Ester L-1695 (HLB=16).

The same procedure was performed as in Example 1 to heat treat the simulated blue-colored beverage, and the color value retention rate before and after heating was measured. The results indicated that the color value retention rate was 85.1%.

Example 4

The same procedure was performed as in Example 1 to obtain a simulated blue-colored beverage (a mass ratio of phycocyanin/emulsifier=0.36) except that 0.125% by mass of RYOTO (registered trade mark) Polyglyester L-7D was replaced with 0.1% by mass of RYOTO (registered trade mark) Sugar Ester P-1670 (HLB=16).

The same procedure was performed as in Example 1 to heat treat the simulated blue-colored beverage, and the color value retention rate before and after heating was measured. The results indicated that the color value retention rate was 81.7%.

All the simulated blue-colored beverages of the above-described Examples exhibited excellent safety to the human body and were suited for food purposes (beverage purposes).

Comparative Example 1

The same procedure was performed as in Example 1 to obtain a simulated blue-colored beverage (containing no emulsifier) except that no RYOTO (registered trade mark) Polyglyester L-7D was used.

The same procedure was performed as in Example 1 to heat treat the simulated blue-colored beverage, and the color value retention rate before and after heating was measured. The results indicated that the color value retention rate was 61.6%.

Comparative Example 2

The same procedure was performed as in Example 1 to obtain a simulated blue-colored beverage (a mass ratio of phycocyanin/emulsifier=0.36) except that 0.125% by mass of RYOTO (registered trade mark) Polyglyester L-7D was replaced with 0.1% by mass of RYOTO (registered trade mark) Sugar Ester S-570 (HLB=5).

The same procedure was performed as in Example 1 to heat treat the simulated blue-colored beverage, and the color value retention rate before and after heating was measured. The results indicated that the color value retention rate was 58.2%.

As revealed in a comparison of color value retention rates between Example 4 and Comparative Example 2, it is clear that even when the same amount of nonionic emulsifier formed of the same sucrose ester is used in these Examples, the thermal resistance under acidity is largely different within or outside a threshold of an HLB of 15 and that unless the HLB is 15 or more, no excellent technical effect according to the present invention is exhibited.

INDUSTRIAL APPLICABILITY

The color material aqueous solution according to the present invention contains phycocyanin (A), a polyvalent carboxylic acid (B) containing one or more hydroxy groups, and at least one kind of nonionic emulsifier (C) selected from the group consisting of sucrose esters and polyglycerol esters, the at least one kind of nonionic emulsifier (C) having an HLB of 15 or more. Thus, the color material aqueous solution exhibits excellent thermal stability under acidic conditions and can be suited for use in, for example, confections and breads, noodles, various foods, various beverages, and medicines and cosmetics.

The invention claimed is:
1. An acidic color material aqueous solution comprising phycocyanin (A), a polyvalent carboxylic acid (B) containing one or more hydroxy groups, and at least one kind of nonionic emulsifier (C) selected from the group consisting of sucrose esters and polyglycerol esters, the at least one kind of nonionic emulsifier (C) having an HLB of 15 or more.
2. The color material aqueous solution according to claim 1, wherein an acidity of the color material aqueous solution is a hydrogen ion concentration index (pH) of 3 or less.

3. A method for manufacturing an acidic color material aqueous solution comprising a step of dissolving phycocyanin (A), a polyvalent carboxylic acid (B) containing one or more hydroxy groups, and at least one kind of nonionic emulsifier (C) selected from the group consisting of sucrose esters and polyglycerol esters, the at least one kind of nonionic emulsifier (C) having an HLB of 15 or more, in water (D).

4. The method for manufacturing a color material aqueous solution according to claim 3, wherein a hydrogen ion concentration index (pH) of 3 or less is achieved.

5. The method for manufacturing a color material aqueous solution according to claim 3 further comprising a step of removing phycocyanin aggregates.

6. A blue-colored beverage comprising the color material aqueous solution according to claim 1.

7. A blue-colored beverage comprising the color material aqueous solution according to claim 2.

8. The method for manufacturing a color material aqueous solution according to claim 4 further comprising a step of removing phycocyanin aggregates.

\* \* \* \* \*